United States Patent
Koehler et al.

(10) Patent No.: US 8,212,995 B2
(45) Date of Patent: Jul. 3, 2012

(54) LASER IMAGING SYSTEM WITH UNIFORM LINE ILLUMINATION AND METHOD FOR GENERATING IMAGES

(75) Inventors: Elka E. Koehler, Tucson, AZ (US); Clarence C. Andressen, Tucson, AZ (US); David G. Jenkins, Tucson, AZ (US); Byron B. Taylor, Tucson, AZ (US)

(73) Assignee: Raytheon Company, Waltham, MA (US)

(*) Notice: Subject to any disclaimer, the term of this patent is extended or adjusted under 35 U.S.C. 154(b) by 184 days.

(21) Appl. No.: 12/725,144

(22) Filed: Mar. 16, 2010

(65) Prior Publication Data

US 2011/0228249 A1    Sep. 22, 2011

(51) Int. Cl.
*G01C 3/08* (2006.01)

(52) U.S. Cl. ........................................ 356/4.01
(58) Field of Classification Search .................. 356/4.01
See application file for complete search history.

(56) References Cited

U.S. PATENT DOCUMENTS

| | | | |
|---|---|---|---|
| 4,865,454 A * | 9/1989 | Lazzarini et al. | 356/520 |
| 5,031,236 A * | 7/1991 | Hodgkinson et al. | 398/152 |
| 6,690,472 B2 * | 2/2004 | Kulp et al. | 356/437 |
| 7,262,861 B1 * | 8/2007 | Pepper et al. | 356/502 |
| 7,400,384 B1 * | 7/2008 | Evans et al. | 356/5.01 |
| 7,831,298 B1 * | 11/2010 | Wang et al. | 600/473 |
| 2002/0071122 A1 * | 6/2002 | Kulp et al. | 356/437 |
| 2003/0189633 A1 * | 10/2003 | Allen et al. | 347/246 |
| 2004/0119838 A1 * | 6/2004 | Griffis et al. | 348/215.1 |
| 2006/0079762 A1 * | 4/2006 | Norris et al. | 600/427 |
| 2006/0132758 A1 * | 6/2006 | Some | 356/237.2 |
| 2007/0121107 A1 * | 5/2007 | Tsai et al. | 356/237.2 |
| 2009/0213330 A1 * | 8/2009 | Silverstein et al. | 353/8 |
| 2010/0231911 A1 * | 9/2010 | Fischer et al. | 356/364 |
| 2010/0275334 A1 * | 10/2010 | Proksch et al. | 850/33 |
| 2011/0013144 A1 * | 1/2011 | Silverstein et al. | 353/8 |

* cited by examiner

*Primary Examiner* — Gregory C. Issing
*Assistant Examiner* — Antoine J Bedard
(74) *Attorney, Agent, or Firm* — Schwegman, Lundberg & Woessner, P.A.; Gregory J. Gorrie (57) ABSTRACT

Embodiments of a laser imaging system with uniform line illumination and method for generating images are generally described herein. In some embodiments, the laser imaging system includes a polarizer beam splitter to angularly separate an input laser beam into a pair of overlapping cross-polarized beams having a first angular separation therebetween, and a diffraction optic beamlet generator to generate a plurality of beamlets of alternating polarization states with a second angular separation therebetween. The laser imaging system may also include a focal-plane array (FPA) having a field-of-view (FOV) to be illuminated by the plurality of beamlets.

20 Claims, 6 Drawing Sheets

LASER IMAGING SYSTEM WITH UNIFORM LINE ILLUMINATION AND METHOD FOR GENERATING IMAGES

GOVERNMENT RIGHTS

This invention was made with United States Government support under Contract Number N68936-08-C-0034. The United States Government has certain rights in this invention.

TECHNICAL FIELD

Embodiments pertain to laser imaging and laser imaging systems. Some embodiments pertain to laser detection and ranging (LADAR) imaging and LADAR imaging systems. Some embodiments pertain to light detection and ranging (LIDAR) imaging and LIDAR imaging systems.

BACKGROUND

Laser imaging may be used to generate two-dimensional images while LADAR imaging may be used to generate three-dimensional images that include target depth. One issue with Laser and LADAR imaging is uniformly illuminating a target. Uniform illumination improves target resolution as well as range resolution in LADAR systems. Conventional laser and LADAR systems have difficulty achieving uniform illumination because of the Gaussian irradiance of laser sources.

Thus, there are general needs for laser and LADAR imaging systems and methods that provide a uniformly illuminated profile at the target. There are also general needs for laser and LADAR imaging systems and methods that provide for improved target resolution including improved range resolution.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
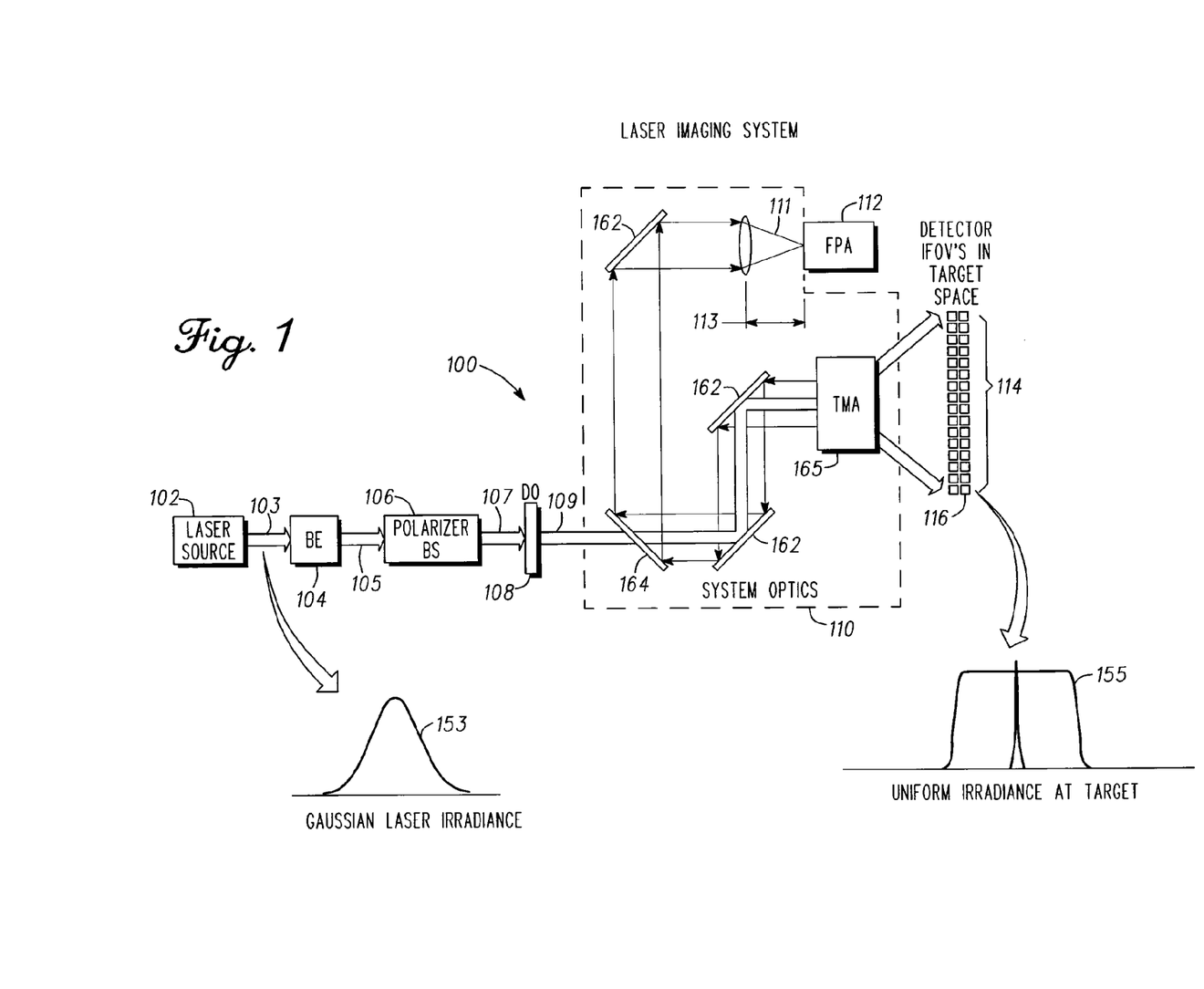
FIG. 1 is a functional diagram of a laser imaging system in accordance with some embodiments.

FIG. 1 is a functional diagram of a laser imaging system in accordance with some embodiments. Laser imaging system 100 includes, among other things, a polarizer beam splitter (BS) 106 to angularly separate (i.e., split) an input laser beam 105 into a pair of overlapping cross-polarized beams 107. The pair of overlapping cross-polarized beams 107 may have a first angular separation therebetween. Laser imaging system 100 also includes a diffraction optic (DO) beamlet generator 108 to generate a plurality of beamlets 109 of alternating polarization states. The plurality of beamlets 109 of alternating polarization states may have a second angular separation therebetween. Laser imaging system 100 also includes a focal-plane array (FPA) 112 having a field-of-view (FOV) 114 that is illuminated by the plurality of beamlets 109.

In accordance with embodiments, the plurality of beamlets 109 may illuminate detector elements 116 within the FOV 114 such that adjacent beamlets may be partially overlapping and have alternating polarization states. The illumination of the detector elements 116 with alternating polarization states helps reduce, and may virtually eliminate, destructive interference between the adjacent beamlets. This allows the beamlets 109 to be very closely spaced in the FOV 114 of the FPA 112. Accordingly, target resolution and range may be increased and blank spots may be eliminated.

The laser imaging system 100 may also include a beam expander (BE) 104 to set a beam divergence of the input laser beam 105 provided to the polarizer beam splitter 106. The beam divergence, the first angular separation and the second angular separation may be selected to illuminate a column or line of detector elements 116 with the beamlets 109 with a uniform irradiance 155. In these embodiments, laser imaging system 100 may provide a uniformly illuminated profile at the target which may provide for improved target resolution and, in some embodiments, improved range resolution. These embodiments are discussed in more detail below.

In some embodiments, the beam expander 104 may be set to widen (i.e., increase the divergence of) an input laser beam 103 and provide a smaller input laser beam (with greater divergence) to the polarizer beam splitter 106. In other embodiments, the beam expander 104 may be set to reduce the divergence of the input laser beam 103 and provide a larger diameter laser beam with less divergence to the polarizer beam splitter 106. In some embodiments, the beam expander 104 may comprise one or more lenses and in some embodiments, may comprise two lenses.

Laser imaging system 100 may also include laser source 102 to generate the input laser beam 103 to the beam expander 104. The beam expander 104 may operate on the input laser beam 103 and may provide an input laser beam 105 to the polarizer beam splitter 106. Laser imaging system 100 may also include system optics 110 configured to, among other things, help ensure that each of the beamlets 109 illuminates a predetermined number of detector elements 116 in the FOV 114. The FPA 112 may comprise a plurality of detector elements 116. Each detector element 116 may correspond to a single pixel. The system optics 110 may include a plurality of mirrors 162 including one or more scanning mirrors, a transmission/rejection (T/R) coupler 164 and an afocal telescope 165. The afocal telescope 165 may be refractive or reflective, such as a three-mirror anastigmatic (TMA) or catadioptric. In some embodiments, the scanning mirror 162 may be configured to scan the column or line of the interleaved beamlets 109 across the FOV 114 of the afocal telescope 165 to image the target. The T/R coupler 164 may comprise a mirror with a hole to pass the beamlets 109 for transmission. The afocal telescope 165 may comprise optical elements for broadening the transmitted beams as well as a collecting aperture. System optics 110 may include a receive path 111 that may include a focal length 113 discussed in more detail below. Embodiments are not limited to the example configuration of system optics 110 illustrated in FIG. 1.

Although FIG. 1 illustrates detector elements 116 located in target space to illustrate their illumination within the FOV 114 of the FPA 112, it should be understood that the detector elements 116 are physically present and part of FPA 112. In some embodiments, the FPA 112 may be configured to receive returns from a target illuminated by the beamlets 109. Although FIG. 1 illustrates a co-linear configuration in which the same optical path is used for both transmission and reception, this is not a requirement as embodiments are applicable to bi-static configurations which use separate optical paths for transmission and reception.

In some embodiments, the laser imaging system 100 may be a LADAR imaging system. In these embodiments, the laser source 102 may generate a pulsed laser beam as the input laser beam 103 to the beam expander 104, and the FPA 112 may be a LADAR FPA that includes per-pixel range-gating circuitry for use in determining target depth. In some of these LADAR imaging embodiments, the per-pixel range-gating circuitry may be part of a readout integrated circuit (ROIC) for three-dimensional (3D) target resolution. In these embodiments, the per-pixel range-gating circuitry may utilize the pulsed laser beam input to determine target depth. In some of these embodiments, the LADAR imaging system may be used for 3-D mapping.

In some other embodiments, the laser imaging system may be configured to generate two-dimensional images. In these embodiments, laser source 102 may be a continuous-wave (CW) laser source. In some embodiments, laser imaging system 100 may be a LIDAR imaging system.

In some embodiments, the laser source 102 may provide an input laser beam 103 having a Gaussian irradiance distribution 153. In some embodiments, the laser source may generate an input laser beam 103 having primarily S-polarization components and P-polarization components. In these embodiments, the input laser beam may be provided to the polarizer beam splitter 106 through beam expander 104. These embodiments are discussed in more detail below.

In some alternate embodiments, the laser source 102 may generate an input laser beam 103 having a single linear polarization (i.e., either S or P polarization). In these embodiments, an optional half-wavelength plate may be used to generate a laser beam with both S and P polarization components for input to the polarizer beam splitter 106 through beam expander 104. These embodiments are discussed in more detail below.

In some other embodiments, the laser source 102 may generate an input laser beam 103 without any particular polarization components. In these embodiments, the polarizer beam splitter 106 may operate on the S and P polarization components of the input laser beam 103 to generate the pair of overlapping cross-polarized beams 107 (i.e., with the S and P polarizations) having a first angular separation therebetween. These embodiments are discussed in more detail below.

In some other embodiments, the laser source 102 may generate an input laser beam 103 that is circularly polarized. In these embodiments, the polarizer beam splitter 106 may operate on the S and P polarization components of the circularly polarized input laser beam 103 to generate the pair of overlapping cross-polarized beams 107 (i.e., with the S and P polarizations) having the first angular separation therebetween. These embodiments are discussed in more detail below.

Some conventional optical imaging systems use Hershel prisms which split and flip an input beam's intensity distribution. However, Hershel prisms may not provide sufficiently uniform illumination and are sensitive to alignment of the optical elements. Some other conventional optical imaging systems use aspheric refractive beam shapers. Aspheric refractive beam shapers may help redistribute the input beam's intensity; however, these beam shapers are highly sensitive to alignment of the optical elements.

Figure 2:
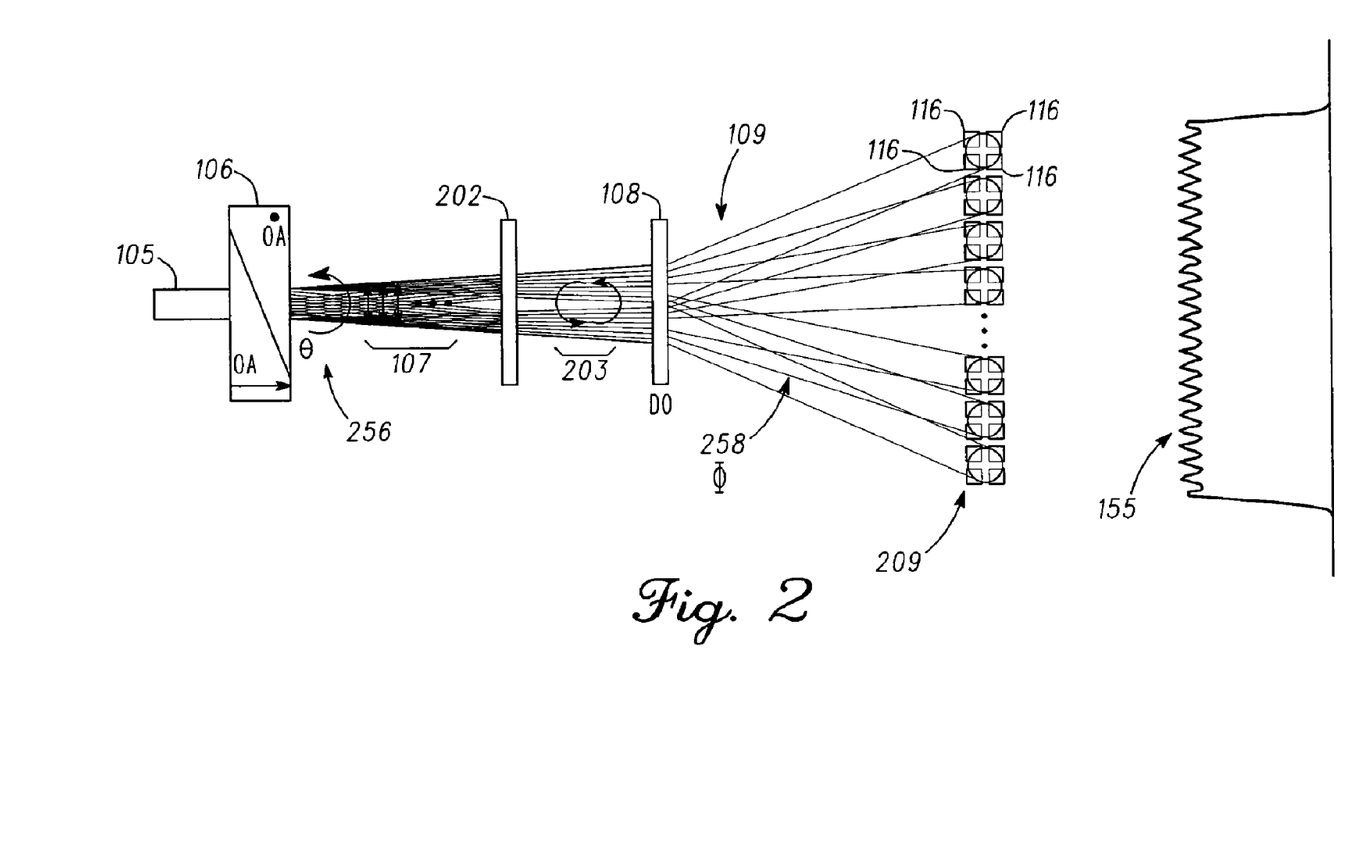
FIG. 2 illustrates the operation of polarizer beam splitter and a diffraction optic beamlet generator in accordance with some embodiments.

FIG. 2 illustrates the operation of a polarizer beam splitter and a diffraction optic beamlet generator, in accordance with some embodiments. The polarizer beam splitter (BS) 106 angularly separates an input laser beam 105 into a pair of overlapping cross-polarized beams 107 having a first angular separation ($\Theta$) 256 therebetween. The diffraction optic (DO) beamlet generator 108 generates the plurality of beamlets 109 of alternating polarization states 209 with the second angular separation ($\Phi$) 258 therebetween.

In some embodiments, the plurality of beamlets 109 may be configured to illuminate a column (e.g., a line) of the detector elements 116 as illustrated in FIG. 2. In these embodiments, each beamlet 109 may illuminate a predetermined number of detector elements 116 of the column. In the illustrated embodiments, the DO beamlet generator 108 generates a column of very closely spaced or partially overlapping interleaved beamlets 109 of the alternating polarization states 209 with the second angular separation ($\Phi$) 258 therebetween to illuminate the column of the detector elements 116. As discussed above, the beam divergence set by the beam expander 104 (FIG. 1), the first angular separation 256 and the second angular separation 258 are selected to illuminate a column or line of detector elements 116 with the beamlets 109 with uniform irradiance 155 at the target.

In these embodiments, the polarizer beam splitter 106 separates the beam into two orthogonal or nearly orthogonal polarization states, with the first angular separation 256 and the DO beamlet generator 108 creating a plurality of closely angularly separated beamlets with alternating polarizations.

In some embodiments, the column of the detector elements 116 may be a single column of detector elements 116 and each beamlet 109 may be configured to illuminate a single detector element 116. In other embodiments, as shown in the illustrated embodiments, the column of the detector elements 116 may be a dual column of detector elements 116 and each beamlet 109 may be configured to illuminate four detector elements 116 (e.g., a set of 2×2 detector elements 116). In some example embodiments, the single column may comprise 128 detector elements 116, while the dual column may comprise 256 detector elements, although this is not a requirement.

In some embodiments when more than a two-wide detector pixel column is illuminated, additional optics, such as an aspheric refractive spreader, may be used to spread the beam across the detector rows evenly.

In some embodiments, the first angular separation 256 and the second angular separation 258 may be determined based on an instantaneous-field-of-view (IFOV) of the FPA 112 (FIG. 1). In these embodiments, the IFOV of the FPA 112 may be based on a detector pixel width of each pixel divided by the focal length 113 (FIG. 1) of the receive path 111 (FIG. 1).

In some embodiments, the first angular separation 256 (i.e., between the cross-polarized beams 107) may be a very small angular separation of substantially less than 500 micro-radians. The second angular separation 258 (i.e., between the alternating polarizations states 209 of the beamlets 109) may range between two-hundred and one-thousand micro-radians. In some embodiments, the second angular separation 258 is on the order of two times the first angular separation 256. The first angular separation 256 may be on the order of one IFOV for a single column of detectors, or two IFOVs for two columns of detectors. In some example embodiments, the first angular separation 256 may be on the order of approximately 240 micro-radians and the second angular separation 258 may be on the order of 480 micro-radians, depending on the IFOV of the FPA 112, although the scope of the embodiments is not limited in this respect. The first angular separation 256 may be limited by diffraction (i.e., diffraction limited) between the cross-polarized beams 107. In some embodiments, the first angular separation 256 may be approximately half the second angular separation 258, though other angles can be used. The full angular spread of the DO may roughly match the angular detector FOV.

In some embodiments, the DO beamlet generator 108 may have a predetermined grating period to generate the beamlets 109 with the second angular separation 258 therebetween. In these embodiments, the grating period may be selected to uniformly illuminate the FOV 114 of the FPA 112 with the plurality of beamlets 109 with a uniform irradiance 155. The grating period (d) of the DO beamlet generator 108 may be equal to $\lambda/\theta$. The diameter of the input beam (cross-polarized beams 107), for example, should be greater than the grating period. In some example embodiments, the grating period may equal 13.5 millimeters.

The illumination of the detector elements 116 in the FOV 114 of the FPA 112 with the beamlets 109 of the alternating polarization states 209 helps prevent destructive interference between adjacent beamlets, thereby allowing the beamlets 109 to be closely spaced and slightly overlapped in the FOV 114 of the FPA 112 to help prevent blank spots in an image of the target.

Figure 3A:
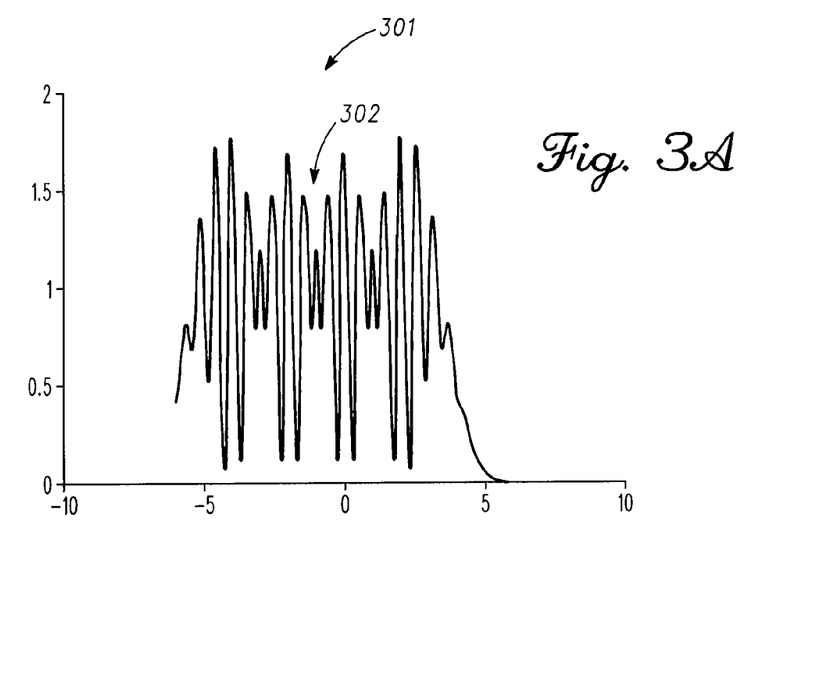
FIG. 3A illustrates destructive interference between closely-spaced beamlets.
Figure 3B:
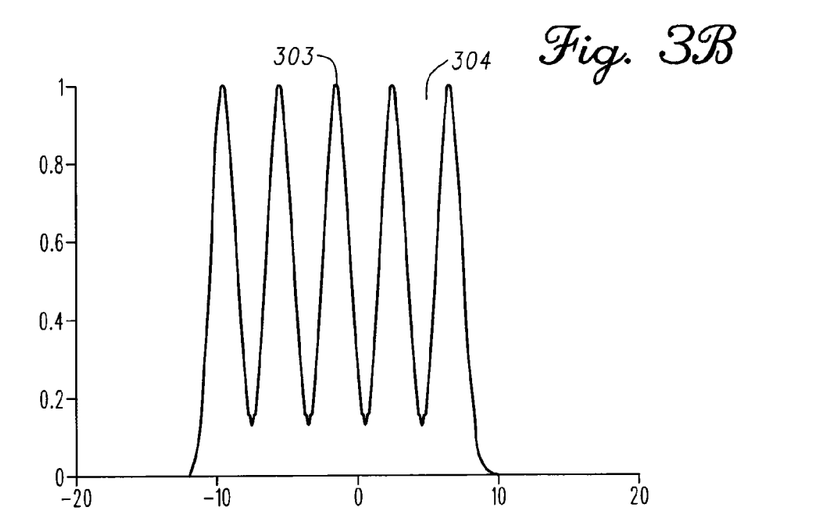
FIG. 3B illustrates blank spots resulting from widely spaced beamlets.
Figure 3C:
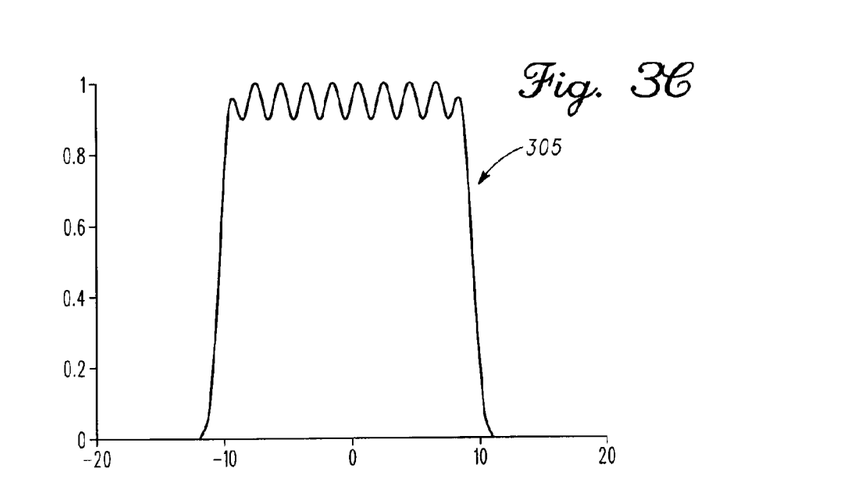
FIG. 3C illustrates closely-spaced or partially overlapping beamlets having alternating orthogonal polarizations in accordance with some embodiments.

As illustrated in FIG. 3A, the use of closely spaced or partially overlapping beamlets 301 having the same polarization results in destructive interference 302 destroying beam uniformity. As illustrated in FIG. 3B, the use of widely separated beamlets 303 reduces destructive interference but results in blank spots 304 in an image of the target. As illustrated in FIG. 3C, the use of closely-spaced or partially overlapping beamlets 305 having alternating orthogonal polarizations, in accordance with embodiments, reduces and may illuminate destructive interference to help prevent blank spots in an image of the target.

Referring back to FIG. 2, in some embodiments, the input laser beam 105 provided to the polarizer beam splitter 106 may comprise an input laser beam with both an S-polarization component and a P-polarization component. The pair of overlapping cross-polarized beams 107 generated by the polarizer beam splitter 106 may comprise a beam having the S-polarization component and a beam having the P-polarization component with the first angular separation ($\Theta$) 256 therebetween. The S and P polarization components may generally correspond to horizontal and vertical polarization components. The pair of overlapping cross-polarized beams 107 generated by the polarizer beam splitter 106 may comprise orthogonal (non-interfering) beams.

In some embodiments, an optional phase plate 202 may be used to convert the pair of overlapping cross-polarized beams 107 to cross-polarized beams 203 having orthogonal circular polarizations. The phase plate 202 may be a quarter-wavelength plate. In these embodiments, the DO beamlet generator 108 generates the beamlets 109 with alternating orthogonal circular polarizations with the second angular separation 258 therebetween. In these embodiments, the phase plate 202 may convert the beam having the S-polarization component and the beam having the P-polarization component to cross-polarized beams 203 having orthogonal circular polarizations. In these embodiments, the orthogonal circular polarizations may correspond to right and left circular polarizations. The use of cross-polarized beams 203 having orthogonal circular polarizations may help reduce target sensitivity that may result from the use of horizontal and vertical polarized beams. For example, vertical and horizontal metal surfaces on a target are more uniformly sensitive to circular polarized signals than to horizontal and vertical polarized signals.

Figure 4:
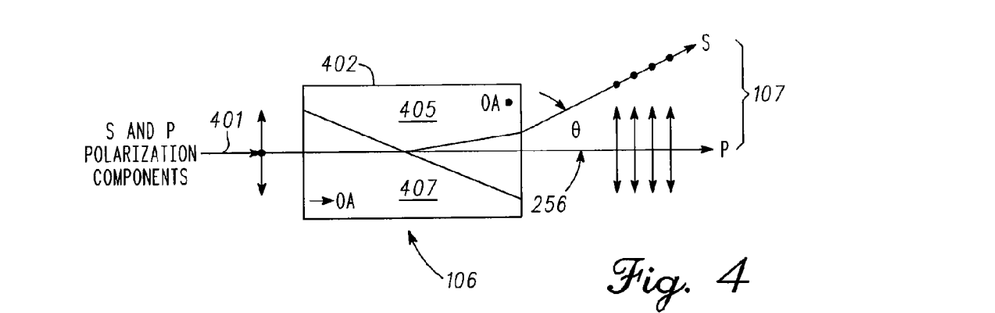
FIG. 4 illustrates the operation of a polarizer beam splitter in accordance with some embodiments.

FIG. 4 illustrates the operation of a polarizer beam splitter 106, in accordance with some embodiments. The polarizer beam splitter 106 may angularly separate an input laser beam having S and P polarization components into a pair of overlapping cross-polarized beams 107 having the first angular separation ($\Theta$) 256 therebetween. As illustrated in FIG. 4, beams that are S-polarized are reflected at angle $\Theta$ (corresponding to the first angular separation 256), while beams that are P-polarized are provided directly through without a reflection angle.

In some embodiments, the polarizer beam splitter 106 may comprise a Rochon prism 402 to angularly-separate the cross-polarized beams 401 to provide the cross-polarized beams with the first angular separation 256 therebetween. In some embodiments, the Rochon prism 402 may comprise wedges 405 and 407 of a birefringent material, such as crystal quartz or magnesium fluoride, which may be cut at angles and bonded together. A Rochon prism is compact (e.g., less than 10 mm thick) and is less sensitive to centration alignment.

Figure 5:
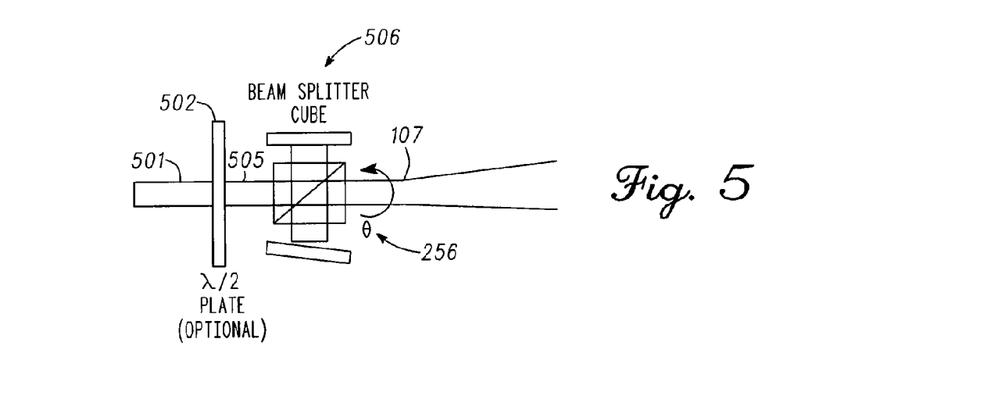
FIG. 5 illustrates the operation of a portion of a laser imaging system in accordance with embodiments that include a beam-splitter cube.

FIG. 5 illustrates the operation of a portion of a laser imaging system in accordance with embodiments that include a beam-splitter cube. In these embodiments, the polarizer beam splitter 106 (FIG. 1) may comprise a beam-splitter cube 506 to separate the S and P polarization components of an input laser beam 505 and provide the pair of overlapping cross-polarized beams 107 having the first angular separation 256 therebetween. In some embodiments, a waveplate may be used to balance the S and P polarization states entering the polarizer beam-splitter cube 506. In some embodiments, an optional half-wavelength plate 502 may be used to generate a laser beam with both S and P polarization components from an input laser beam 501.

Figure 6:
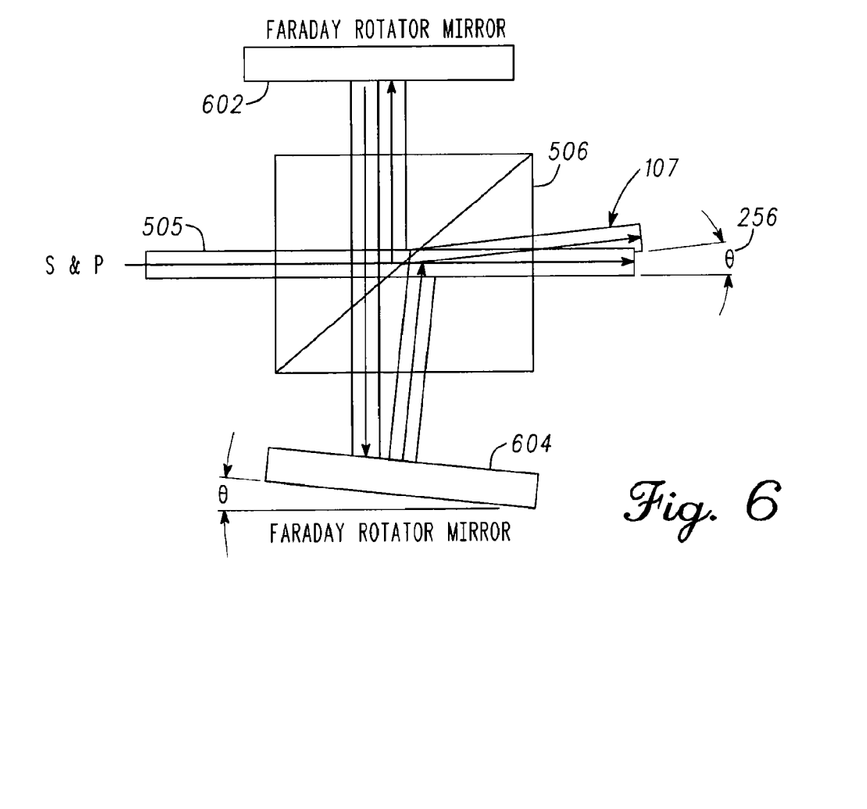
FIG. 6 illustrates the operation of a beam-splitter cube and a Faraday rotator mirror in accordance with some embodiments.

FIG. 6 illustrates the operation of a beam-splitter cube and a Faraday rotator mirror in accordance with some embodiments. In these embodiments, the beam-splitter cube 506 and a Faraday rotator mirror 602 and 604 may separate S and P polarization components of an input laser beam 505 and provide the pair of overlapping cross-polarized beams 107 having the first angular separation 256 therebetween. The polarizing beam-splitter cube 506 uses optical coatings or frustrated internal reflections to reflect and transmit the S and P polarization states. Mirror 602 may convert a polarization state from, for example, S polarization, which would have, for example, been reflected to P polarization, which may then pass back through the beam-splitter cube 506 to hit another mirror 604. The second mirror 604 may then slightly angularly deviate the beam and convert it back to S polarization, where it is reflected and passed out with the first angular separation 256 with respect to the P polarization beam.

Figure 7:
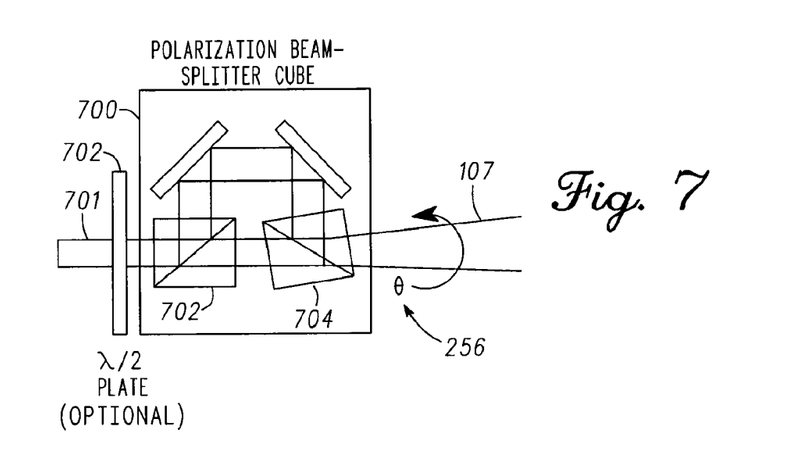
FIG. 7 illustrates the operation of a portion of a laser imaging system in accordance with embodiments that include a polarization beam-splitter cube.

FIG. 7 illustrates the operation of a portion of a laser imaging system in accordance with embodiments that include a polarization beam-splitter cube. In these embodiments, the polarizer beam splitter 106 (FIG. 1) may comprise a polarization beam-splitter cube 700. The polarization beam-splitter cube 700 may comprise two polarizing beam-splitter cubes 703 and 704 to generate the cross-polarized beams 107 having the first angular separation 256 therebetween. In some embodiments, an optional half-wavelength plate 702 may be used to generate a laser beam with both S and P polarization components from an input laser beam 701.

Figure 8:
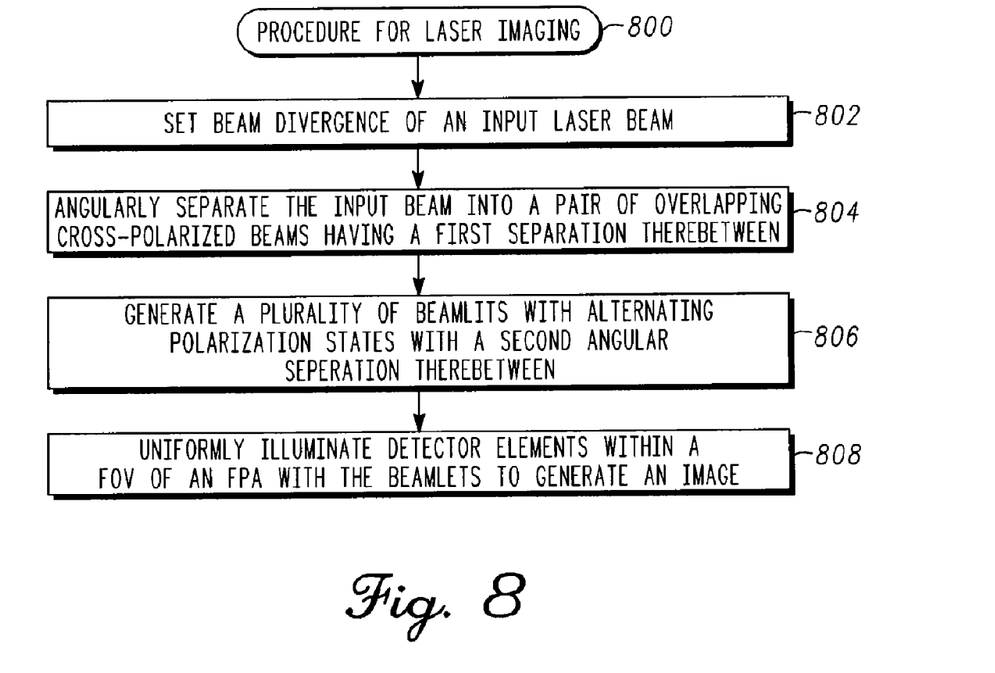
FIG. 8 is a procedure for laser imaging in accordance with some embodiments.

FIG. 8 is a procedure for laser imaging in accordance with some embodiments. Procedure 800 may be performed by laser imaging system 100 (FIG. 1), although other laser imaging system configurations may also be used.

In operation 802, the beam divergence of an input laser beam is set. In some embodiments, the input laser beam may be expanded. Operation 802 may be performed by a beam expander, such as beam expander 104 (FIG. 1). In some embodiments, the divergence of the beam may be on the order of 1.5 times the IFOV for a single detector column, or three times the IFOV for two detector columns. The divergence of the beam may be further optimized by defocusing the beam expander 104.

Operation 804 comprises angularly separating an input laser beam into a pair of overlapping cross-polarized beams having a first angular separation therebetween. Operation 804 may be performed by a polarizer beam splitter, such as polarizer beam splitter 106 (FIG. 1).

Operation 806 comprises generating a plurality of beamlets of alternating polarization states with a second angular separation therebetween. Operation 806 may be performed by a diffraction optic beamlet generator, such as diffraction optic beamlet generator 108 (FIG. 1).

Operation 808 comprises uniformly illuminating detector elements within FOV of an FPA with the beamlets to generate an image. The beam divergence of the beam expander, the first angular separation 256 provided by the polarizer beam splitter, and the second angular separation 258 provided by the diffraction optic beamlet generator may be selected to illuminate a column or line of detector elements 116 in the FOV of a FPA in target space with a uniform irradiance 155.

Accordingly, laser imaging system 100 may provide a uniformly illuminated profile at the target which may provide for improved target resolution and, in some embodiments, improved range resolution. Conventional imaging systems have difficulty achieving uniform illumination because of the Gaussian irradiance of laser sources. The use of a refractive element, such as a lens, to map a circular Gaussian beam into a uniformly illuminated narrow stripe or line is unable to achieve uniform illumination due to the large amount of spreading for highly anamorphic beams, which is dependent on both the beam size on the detector element and its location. Small deviations from the expected beam size and position can decrease beam uniformity and decrease the detection range because detection is only as good as the smallest pixel energy.

The use of a diffractive optic to create a grid of points to be mapped to each detector pixel is also unable to achieve uniform illumination because the grid pattern needs to be precise in order for the pixels and spots to line up and the pixels would need to be spaced far enough apart so that the spots do not overlap enough to interfere.

Furthermore, the use of closely-spaced detectors is unable to be used to achieve uniform illumination because the overlapping spots interfere and cause a non-uniform illumination pattern, and if the angular separation between the pixels is small, a large beam will be needed on the diffractive optic in order to obtain this separation. This is impractical, particularly in a shared aperture system. A Herschel prism, which splits and flips the incident Gaussian circular beam, is unable to achieve uniform illumination due to interference between adjacent two beams.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A laser imaging system comprising:
   a polarizer beam splitter to angularly separate an input laser beam into a pair of overlapping cross-polarized beams having a first angular separation therebetween;
   a beam expander to set a beam divergence of the input laser beam provided to the polarizer beam splitter;
   a diffraction optic beamlet generator having a predetermined grating period, the diffraction optic beamlet generator configured to receive the pair of overlapping cross-polarized beams and generate a plurality of beamlets, wherein adjacent beamlets have alternating orthogonal polarization states and a second angular separation therebetween; and
   a focal-plane array (FPA) having a field-of-view (FOV) to be illuminated by the plurality of beamlets,
   wherein the beam divergence, the first angular separation and the second angular separation are selected to illuminate a column or line of detector elements of the FPA with a uniform irradiance.

2. The laser imaging system of claim 1 wherein adjacent of the beamlets are at least partially overlapping.

3. The laser imaging system of claim 2 wherein the first angular separation and the second angular separation are determined based on an instantaneous-field-of-view (IFOV) of the FPA.

4. The laser imaging system of claim 3 wherein the first angular separation is a very small angular separation of substantially less than one-tenth of one degree, and
   wherein the second angular separation ranges between ten and one-thousand micro-radians.

5. The laser imaging system of claim 2 wherein the FPA comprises a plurality of detector elements, each detector element corresponding to a single pixel, and
   wherein the plurality of beamlets are to illuminate a column of the detector elements, each beamlet to illuminate a predetermined number of detector elements of the column.

6. The laser imaging system of claim 5 wherein the column of detector elements is a single detector element wide, and
   wherein the beam divergence, the first angular separation and the second angular separation are selected to cause each beamlet to illuminate a single detector element.

7. The laser imaging system of claim 5 wherein the column of detector elements is two detector elements wide, and
   wherein the beam divergence, the first angular separation and the second angular separation are selected to cause each beamlet to illuminate a two-by-two group of four detector elements.

8. The laser imaging system of claim 1 wherein the input laser beam provided to the polarizer beam splitter comprises an input laser beam with both an S-polarization component and a P-polarization component, and
   wherein the pair of overlapping cross-polarized beams generated by the polarizer beam splitter comprise a beam having the S-polarization component and a beam having the P-polarization component with the first angular separation therebetween.

9. The laser imaging system of claim 8 further comprising a phase plate to convert the pair of overlapping cross-polarized beams generated by the polarizer beam splitter to cross-polarized beams having orthogonal circular polarizations, wherein the diffraction optic beamlet generator generates the plurality of beamlets of alternating orthogonal circular polarizations with the second angular separation therebetween.

10. The laser imaging system of claim 2 wherein the laser imaging system is a laser detection and ranging (LADAR) imaging system, wherein the LADAR imaging system further comprises a laser source to generate a pulsed laser beam as the input laser beam to the beam expander, and wherein the FPA is a LADAR FPA that includes per-pixel range-gating circuitry for use in determining target depth.

11. The laser imaging system of claim 2 wherein the laser imaging system is configured to generate two-dimensional images, and wherein the laser imaging system further comprises a continuous-wave (CW) laser source.

12. The laser imaging system of claim 1 wherein the polarizer beam splitter comprises a Rochon prism to angularly-separate the cross-polarized beams to provide the cross-polarized beams having the first angular separation therebetween.

13. The laser imaging system of claim 1 wherein the polarizer beam splitter comprises a beam-splitter cube to separate S and P polarization components of the input laser beam and provide the pair of overlapping cross-polarized beams having the first angular separation therebetween.

14. The laser imaging system of claim 1 wherein the polarizer beam splitter comprises two polarizing beam-splitter cubes to generate the cross-polarized beams having the first angular separation therebetween.

15. A method for laser imaging comprising:

angularly separating an input laser beam into a pair of overlapping cross-polarized beams having a first angular separation therebetween;

setting a beam divergence of an input laser beam prior to the angularly separating;

generating a plurality of beamlets a diffraction optic beamlet generator having a predetermined grating period, wherein adjacent beamlets have alternating orthogonal polarization states and a second angular separation therebetween; and uniformly illuminating detector elements within a field-of-view (FOV) of a focal-plane array (FPA) with the beamlets to generate an image, wherein the beam divergence, the first angular separation and the second angular separation are selected to illuminate a column or line of detector elements of the FPA with a uniform irradiance.

16. The method of claim 15 wherein adjacent of the beamlets are at least partially overlapping.

17. The method of claim 16 wherein the FPA comprises a plurality of the detector elements, each detector element corresponding to a single pixel, and wherein illuminating comprises illuminating a column of the detector elements with the plurality of beamlets, each beamlet to illuminate a predetermined number of detector elements of the column.

18. A LADAR imaging system comprising:

a polarizer beam splitter to angularly separate an input laser beam into a pair of overlapping cross-polarized beams having a first angular separation therebetween;

a diffraction optic beamlet generator having a predetermined grating period, the diffraction optic beamlet generator configured to receive the pair of overlapping cross-polarized beams and to generate a plurality of beamlets of alternating orthogonal polarization states with a second angular separation therebetween;

a LADAR focal-plane array (FPA) having a field-of-view (FOV) to be illuminated by the plurality of beamlets;

a beam expander to set a beam divergence of the input laser beam provided to the polarizer beam splitter; and a laser source to generate a pulsed laser beam as the input laser beam to the beam expander, wherein the beam divergence, the first angular separation and the second angular separation are selected to illuminate a column or line of detector elements of the FPA with a uniform irradiance.

19. The LADAR imaging system of claim 18 wherein the LADAR FPA includes per-pixel range-gating circuitry for use in determining target depth, wherein the plurality of beamlets illuminate detector elements within the FOV, and wherein adjacent of the beamlets are at least partially overlapping.

20. The LADAR imaging system of claim 19 further comprising a phase plate to convert the pair of overlapping cross-polarized beams generated by the polarizer beam splitter to cross-polarized beams having orthogonal circular polarizations, wherein the diffraction optic beamlet generator generates the plurality of beamlets of alternating orthogonal circular polarizations with the second angular separation therebetween.

* * * * *